Nov. 13, 1962  R. F. MOORE  3,063,752
BODY SUPPORTING SEAT WITH RELAXATION MEANS
Filed July 5, 1961  2 Sheets-Sheet 2
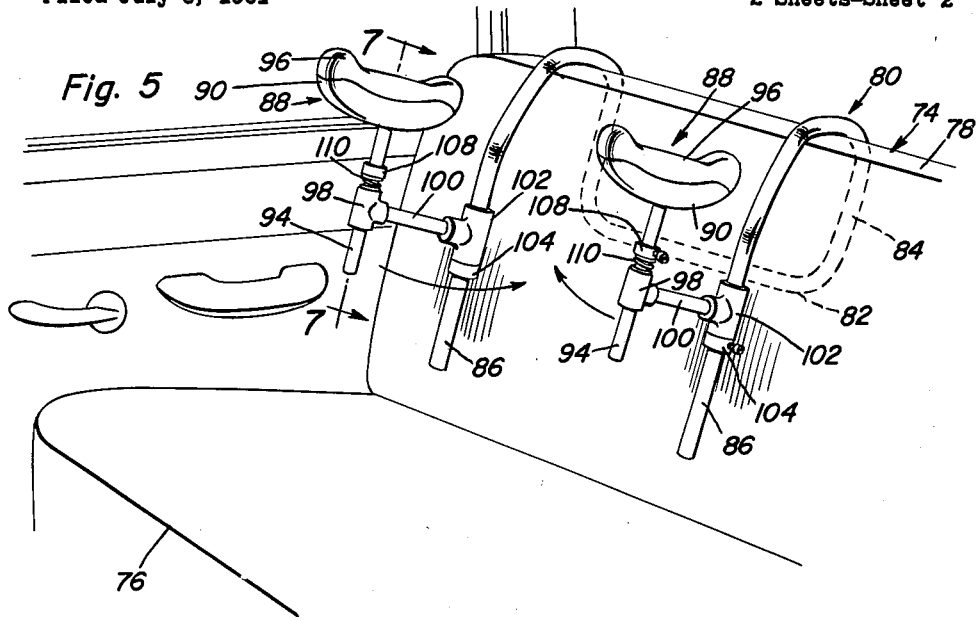
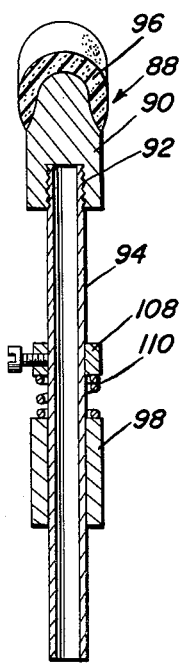
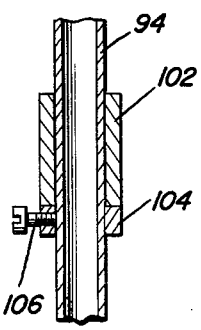
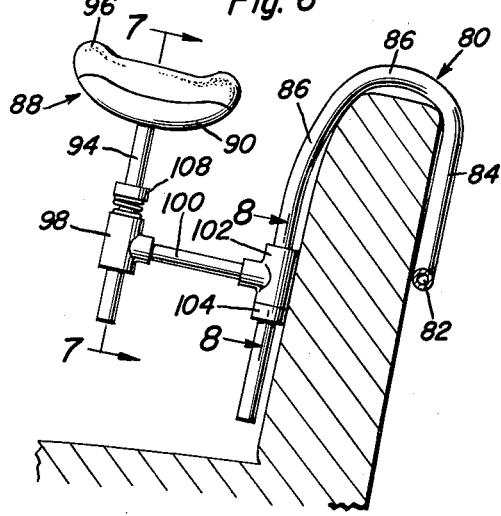
Redding F. Moore
INVENTOR.

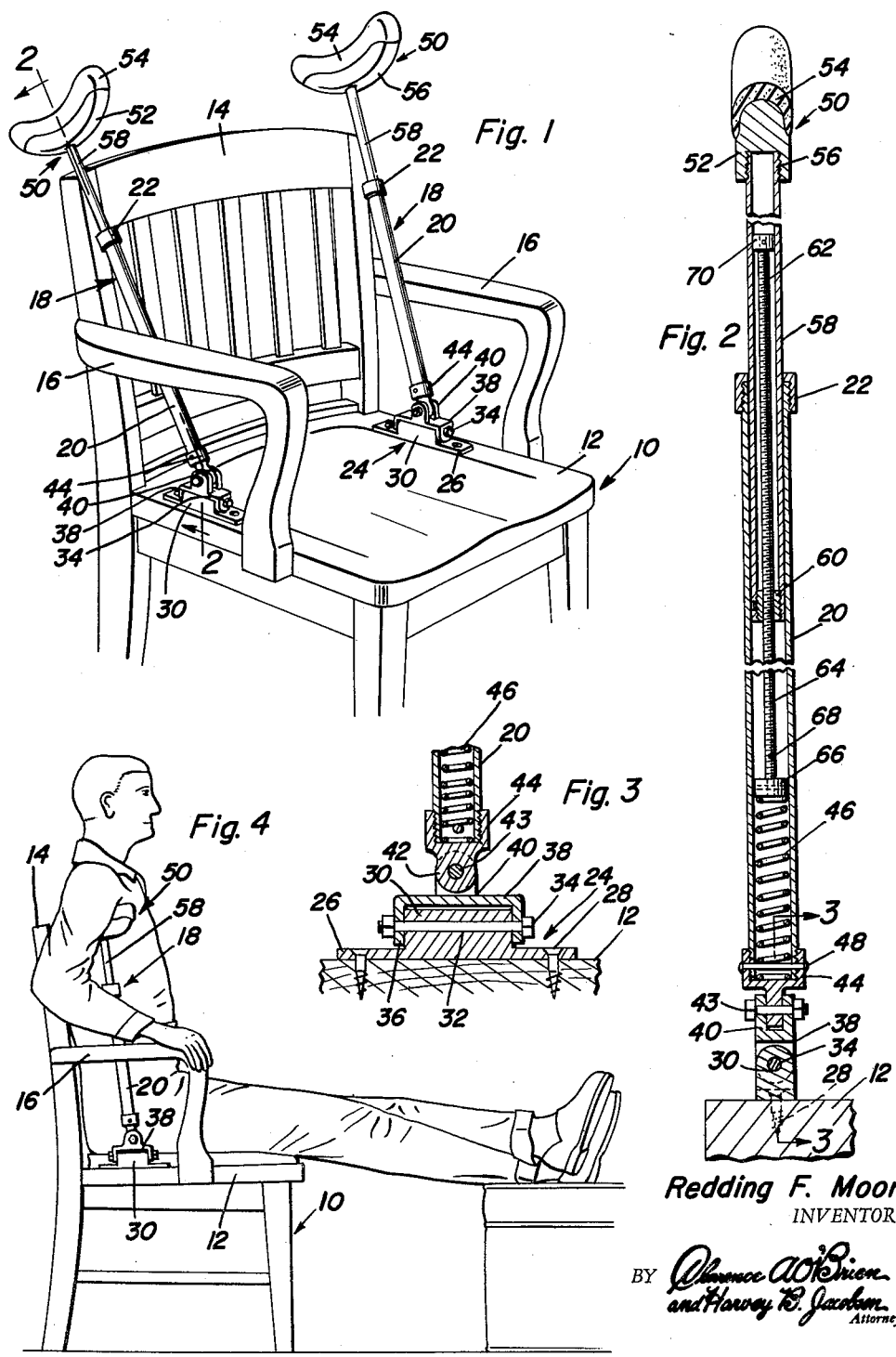

United States Patent Office 3,063,752
Patented Nov. 13, 1962

3,063,752
BODY SUPPORTING SEAT WITH RELAXATION MEANS
Redding F. Moore, P.O. Box 5126, North Charleston, S.C.
Filed July 5, 1961, Ser. No. 121,864
4 Claims. (Cl. 297—411)

This invention relates to improved body supporting means which is applicable to a seat structure, a chair or alternatively an automobile seat construction for examples, and through the medium of which a user thereof may sit in an erect position and effectually support the body and arms whereby to relieve debilitating pressures, strain and tension, and to bring about desirably comforting rest and relaxation to the entire body.

The invention, while most helpful to and recommended for invalids, disabled or handicapped persons suffering with polio, strained and injured backs, spinal column tension and numerous aching back and weakening ailments, is aptly suitable for persons who are victims, temporary or otherwise, of poor sitting posture or similar weak back muscle straining habits. Therefore, a general objective is to offer members of the public an easy-to-use simple, practical economical appliance for supporting the user under limitary restraint in a manner which involves self-treatment and resulting restful relaxation. To this end the invention features appropriate and tried adaptations which distributively support the weight of the torso or body without resort to exertion and undue physical effort to, as stated, cope with stress, strain and tension, thus minimizing fatigue and distressing aches and pains.

Another object of the invention is to provide an adaptable invention which may be properly categorized as an attachment and which lends itself to acceptable and practical use on a conventional-type arm chair or an automobile seat, as the case may be, and which is adjustable and renders itself comfortingly suitable to persons of varying statures while, at the same time allows freedom of movement of the arms and hands.

A further object of the invention is to improve upon prior art torso and body supporting devices and in doing so to advance the art, whereby to thus provide means which serves the purposes for which it is intended, which may be installed expeditiously, and is such in design and construction that it will justify endorsement and approval by manufacturers, doctors, nurses and patients, particularly those who have experienced the helpful and healthful benefits derived from its use.

In carrying out the invention two typical embodiments have been devised and successfully used and demonstrated with constantly satisfactory results, both of which introduce proper utilization of well balanced versatile crutches, that is special adaptations thereof for persons in a sitting position. To this end crutch-type arm rests are employed and mounted in such a manner that they are spring-biased, vertically adjustable, may turn on vertical axes and when not being used may be caused to rest in readiness for use against an adjacent backrest.

Briefly summarized and considering both embodiments of the invention disclosed it will be noted that it is characterized, generally construed, by body supporting and relaxation means comprising, in combination, relatively stationary seat means, a pair of upstanding support members, means for operatively attaching said members to said seat means, a pair of arm rests, rigid connecting means attached to and depending from each arm rest, said connecting means having lower portions thereof slidingly rotatably and removably fitted in their respectively cooperating support members and permitting the arm rests atop the same to adjust and adapt themselves to the user's particular needs, and cushioning and shock absorbing means cooperable with the connecting means and support members.

In one form of the invention the attaching means comprises a pair of anchoring brackets and these are connected to the chair seat opposite each other in spaced parallelism and in a common plane. Self-adapting universal-type joint means joins the lower ends of the support members to their respective brackets, this self-adapting means being preferably a two-way joint embodying a pair of horizontal hinge pins one above the other with their axes at right angles to each other.

In another form of the invention the means for attaching the aforesaid members comprises a frame. This frame is so constructed that it may be removably harnessed or supported from the backrest of an automobile seat. The support members are hingedly joined to cooperating components of the frame.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a conventional type of a chair having side arms and wherein the seat is provided with duplicate body supporting attachments, the attachments being shown, when not in use, resting against the forward side of the chair back;

FIGURE 2 is an enlarged view in section and elevation taken on the plane of the section line 2—2 of FIGURE 1;

FIGURE 3 is a detail fragmentary sectional view on the plane of the line 3—3 of FIGURE 2;

FIGURE 4 is a view on a smaller scale in side elevation showing how the structure of FIGURE 1 is brought into play and is being used;

FIGURE 5 is a fragmentary perspective view of an automobile seat showing the embodiment of the invention which has been designed and devised for use thereon;

FIGURE 6 is a view in section and elevation based on FIGURE 5 and showing how the attaching and retaining frame is employed;

FIGURES 7 and 8 are enlarged sectional views on the lines 7—7 and 8—8, respectively, of FIGURE 6.

By way of introduction to the description of the details it is to be explained that reference will be made first to FIGURES 1 to 4, inclusive, showing one embodiment of the invention and secondly to the other form or embodiment of the invention illustrated in FIGURES 5 to 8, inclusive.

In FIGURES 1 and 4 the "seat construction" comprises an ordinary or a conventional-type chair 10. Manifestly, other types of chairs may be utilized. In the illustrative chair the seat is denoted at 12 and the rigid backrest at 14 and the L-shaped side arms at 16. The invention is ideally suited to a chair of the type shown and having side arms. Two duplicate attachments or devices are utilized and each device is in the form of a special-purpose crutch, that is a crutch wherein headed upper ends are attached to depending legs or members which are hinged on the chair bottom. More specifically and with reference to a single device or attachment it is denoted as an entity by the numeral 18. The numeral 20 designates a cylindrical barrel or tubular member which constitutes a cylinder and which provides on its interior a suitable socket. If desired a suitable screw cap or equivalent centrally apertured guide 22 may be provided at the top. Novel jointing and anchoring means is employed for mounting the lower end portion of the tubular member or cylinder on the chair seat. To this end a base or bracket 24 is utilized and this bracket has attaching ears 26 screwed or otherwise fastened in place at 28. The rectangular block-like body portion 30 of the bracket is provided with a horizontal open-ended bore 32 to accommodate an assembling and pivoting or hinge bolt 34. The bolt passes through the downturned end portions 36 of a U-shaped yoke or saddle which bridges over the body 30 and is swingable and the bight portion 38 is provided with upstanding ears 40. These ears serve to accommodate a hinging and assembling lug 42 on the lower end of a cup-like fitting 44 which is screwed or otherwise connected to the lower end of the barrel or cylinder all as shown in FIGURE 3. A coil cushioning and shock absorbing spring 46 is confined in the lower portion of the barrel by way of a retaining pin 48 as shown in FIGURE 2. Thus the means 18 is attached or hingedly joined to the chair seat 12 by a two-way hinge and bracket assembly. Consequently the cylinder 20 may be moved from left to right toward and from the adjacent side arms 16 of the chair. It may also be moved forwardly and rearwardly relative to the backrest 14. The armrest, which resembles an armrest on conventional-type crutches, is denoted by the numeral 50 and it comprises a head member or block 52 having a cushioned cap of suitable design and construction fitted thereon, the cap being denoted at 54. This armrest is screwed or otherwise suitably connected as at 56 to the upper end of a depending support member, a member which may also be referred to as a leg 58. In fact the two parts 20 and 58 constitute an extensible and retractible spring biased leg construction adaptable to the purposes intended. More specifically this member 58 is rotatably and slidingly mounted in the socket portion of the cylinder and the lower end thereof is provided with a screw-threaded bushing which is so constructed as to provide an adjusting nut 60. A jackscrew 62 is provided and the median portion is threaded through the nut and the lower end portion 64 depends into the socket where it terminates in a thrust head 66 resting atop the spring. The numeral 68 designates a hole to accommodate a pin or a suitable wrench for adjusting the effective length of the jackscrew. The upper end of the jackscrew is provided with a guiding head 70. As will be evident in FIGURE 1 when the chair and its attached body support crutches 18 are not being used they may be inclined and leaned against the backrest and thus placed in readiness for use. In this connection it will be evident that inasmuch as the brackets 24 are attached to the sides of the seat below what may be called the median portions of the horizontal parts of the sidearms, the sidearms serve to confine the attachments. As a matter of fact the sidearms are usually ideally useful when the invention is brought into use in the manner illustrated in FIGURE 4. It will also be evident from FIGURE 4 that the user can rest the hands and forearms on the sidearms 16 and by placing the custom-fitted armrest 50 beneath the arms he obtains adequate body support and nevertheless has freedom of movement toward and from the backrest and even though the shoulders and arms are balanced and the weight distributively supported the armrests are permitted to swivel or rotate so that the user is not so constrained as to be compelled to resort to undue physical exertions in accustoming himself to this combined chair and body support means. By reason of the telescoping action of the parts as illustrated in FIGURE 2 the coil spring provides the intended and desired cushioning and shock absorbing effects. The tension of the spring can be adjusted by regulating the position of the jackscrew. The universal-type attaching brackets and hinging means, the spring biased shock absorbing and cushioning attachment and the rotatable adaptability of the armrest all contribute to an overall appliance or attachment which serves the purposes for which it is intended. The caps 54 may be made of foam rubber and particularly shaped to the individual in keeping with his particular stature and back and body condition. Experience has shown that self-treatment use of the invention relieves pressure on the lumbar section of the back, cartilage disk, spinal cord or column, head and neck regions and overall vertebra, relieves body tension and by taking care of these and other attending pressures. Also to be mentioned, back pains and aches are efficaciously taken care of.

The same features and advantages are attendant upon the modification of the invention depicted in FIGURES 5 to 8, inclusive. With reference to FIGURES 5 and 6 the seat or seat structure is denoted as an entity by the numeral 74, the seat or cushion at 76 and the backrest at 78. The attaching and retaining means here, which is also applicable and removable is characterized by a tubular metal or an equivalent frame 80. The frame embodies a U-shaped portion having a horizontal bight 82 and vertical portions 84 with the depending forwardly positioned legs 86. In this adaptation the armrest 88 is the same as already described and comprises a block-like head or an equivalent member 90 which is screwed or otherwise fastened, as at 92, atop a vertical depending support member 94. This member may comprise a simple tube as shown. A foam rubber or an equivalent cushioning cap or pad 96 is provided on the armrest. The tubular support member 94 is removably and rotatably mounted in a relatively short cylinder or barrel 98 which corresponds to the aforementioned cylinder or barrel 20. Specifically this part 98 is a simple T-coupling which is screwed on the forward end of a horizontal arm 100 which in turn is connected to second T-shaped coupling 102. This second coupling 102 is slidable and rotatable and also removable in relation to the leg 86. The coupling or sleeve 102 is assembled adjustably and held in place by a collar 104 (FIGURE 8) which in turn is held in place by a setscrew 106. A second collar 108 is provided on the upper or median portion of the crutch member 94 and a coil spring 110 surrounds this member and is confined between the collar 108 at the upper end of the socket-forming cylinder 98. Thus with this arrangement the free rotatable spring tensioned and shock absorbing function is retained corresponding to that illustrated in FIGURE 2.

As is evident this novel automobile-type body rest and support means provides a readily attachable and detachable assemblage. It is simple, practical, economical and embodies many of the features and advantages ascribed to the embodiment depicted in FIGURES 1 and 4. For example as the arrows indicate in FIGURE 5 when the armrests 88 are not being used they can be swung or folded to a compact and convenient out-of-the-way position. This embodiment of the invention has been found to be of aid and helpful relief for bus drivers and in fact all drivers who might find it desirable to use it when driving for hours-on-end is required.

It is conceivable that by utilizing other and suitable types of adapters and attaching devices the invention lends itself to practical use in many other lines of endeavor not specifically mentioned.

It is believed that a careful consideration of the specification and claims in conjunction with the drawings will enable the reader to obtain a clear and comprehensive understanding of the construction, mode of use and features and advantages of the invention. Therefore a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a chair comprising an elongated cylinder open at an upper end, a coil spring housed in the lower portion of the cylinder, a crutch-type head providing an armrest, a tubular shaft member secured to and depending from the armrest and telescoping into the socket portion of the cylinder and slidable and rotatable and having an axially adjustable jack screw with a lower end resting upon said spring, and hinging and bracket means mounted on a lower end of said cylinder for attaching the same to the bottom of a chair.

2. The structure defined in claim 1, and wherein said bracket means embodies a bracket, a swingable yoke hinged on the bracket, said yoke being provided with upstanding ears, and a cylinder jointing and anchoring cap on the lower end of the cylinder hingedly mounted with a lug between said ears.

3. An attachment for an armchair comprising, in combination, bracket means embodying a bracket designed and adapted to be removably mounted on the bottom of the chair adjacent to and beneath a cooperable armrest on said chair, a yoke hingedly mounted on said bracket, an elongated open-ended cylinder, a cylinder-anchoring cap carried by and closing the lower end of said cylinder, said cap hingedly joined to a complemental part of said yoke, a coil spring housed in the lower portion of the cylinder, a crutch-type cushioned armrest, a tubular shaft connected at an upper end to a median portion of a bottom side of said armrest with its axis at right angles to the lengthwise axis of the armrest, a nut fitted in the lower end of said cylinder, an axially adjustable jack-screw threaded through said nut and having an upper portion telescoping upwardly and into the hollow portion of said tubular shaft, and a lower portion depending below said nut and, in conjunction with said shaft, telescoping into the hollow portion of the cylinder, and having a lower end portion resting atop said coil spring.

4. The structure defined in claim 3 and wherein said bracket embodies a body provided at ends thereof with attaching and retaining ears, said yoke being U-shaped and saddled upon and removably hinged in place on said body by way of a horizontal hinge pin, a median portion of said yoke being provided with upstanding ears, said cap having a depending lug interposed between and hingedly connected with said ears and providing a two-way jointing connection between the cylinder and said bracket means.

References Cited in the file of this patent

UNITED STATES PATENTS

| | | |
|---|---|---|
| 1,255,539 | Kuderer | Feb. 5, 1918 |
| 1,378,704 | McPartland | May 17, 1921 |
| 2,602,488 | Conning | July 8, 1952 |
| 2,667,913 | Dustin | Feb. 2, 1954 |